United States Patent [19]

Kato

[11] Patent Number: 4,836,871

[45] Date of Patent: Jun. 6, 1989

[54] MANUFACTURING METHOD FOR AN EXPANDED LAMINATED SHEET

[75] Inventor: Naoyuki Kato, Yokkaichi, Japan

[73] Assignee: Mitsubishi Yuka Badische Co., Ltd., Yokkaichi, Japan

[21] Appl. No.: 127,038

[22] Filed: Nov. 27, 1987

[30] Foreign Application Priority Data

Dec. 2, 1986 [JP] Japan ........................................ 286927
Jun. 11, 1987 [JP] Japan ................................. 62-145754

[51] Int. Cl.$^4$ .......................... B32B 31/24; B32B 5/20
[52] U.S. Cl. ..................................... 156/79; 264/45.4;
427/244; 428/95; 428/313.5
[58] Field of Search ...................... 156/78, 79; 264/280,
264/45.4; 427/244; 428/95, 313.5, 314.4, 314.8

[56] References Cited

U.S. PATENT DOCUMENTS 3,154,604 10/1964 McMillan ........................... 264/45.4
4,214,053 7/1980 Porter ................................ 428/95 X Primary Examiner—Robert A. Dawson
Attorney, Agent, or Firm—Oblon, Spivak, McClelland, Maier, & Neustadt

[57] ABSTRACT

A manufacturing method for a laminated sheet comprises:
  coating a backing coating material on a base fabric (A) which is made of a material having a thermal deformation temperature of at least 150° C., the backing coating material comprising
    (a) a resin aqueous emulsion and
    (b) 150–170 parts by weight of expandable styrene resin particles per 100 parts by weight of solids of the resin aqueous emulsion (a);
  stacking a base fabric (B) which is made of a material having a thermal deformation temperature of at least 150° C. on the layer of backing coating material to form a laminate;
  compressing the laminate from at least one side so as to impregnate base fabric (B) with a portion of the coating material; and
  expanding the expandable styrene resin particles and drying the resin aqueous emulsion by heating to a temperature which is higher than the softening point of the resin of the expandable styrene resin particles and which is lower than the thermal deformation temperature of base fabrics (A) and (B), thereby expanding the expandable styrene resin particles and forming a foam layer between base fabrics (A) and (B).

10 Claims, 1 Drawing Sheet

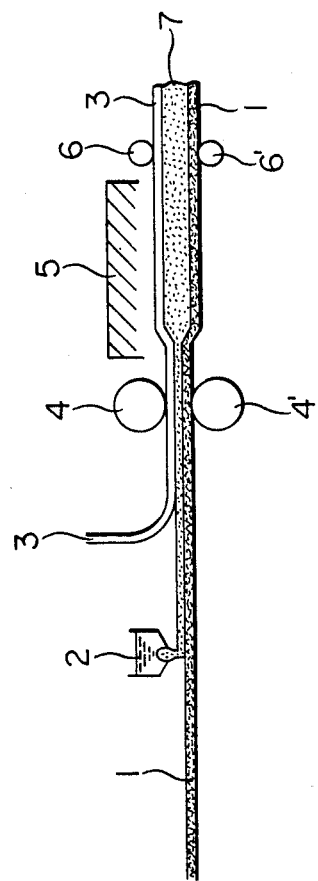

MANUFACTURING METHOD FOR AN EXPANDED LAMINATED SHEET

BACKGROUND OF THE INVENTION

This invention relates to a manufacturing method for a laminated sheet. More particularly, it relates to a manufacturing method for a laminated sheet which has rigidity, heat insulating properties, and shielding properties and can be subjected to deep drawing to form materials suitable for a wide variety of uses including the ceiling, door trim, rear shell, seat back, trunk lid, trunk periphery, floor, and other interior parts of automobiles, the ceilings and walls of buildings, and decorative containers.

In the past, the interior finish of automobiles was made from materials which could withstand temperature in excess of 100° C. were used, such as resin felt whose fibers were packed with phenol-aldehyde condensation resin, expanded synthetic resins, polypropylene complexes, and polypropylene corrugated board. Of these materials, resing felt has excellent stiffness, heat distortion resistance, dimensional stability, and shielding properties, but it is inferior with respect to formability, impact resistance, and lightness. Polypropylene corrugated board has excellent stiffness and lightness, but is is difficult to subject to deep drawing, and being corrugated, it inherently suffers from its strength being directional. Expanded synthetic resins such as polystyrene have superior lightness, but they have poor formability and bending resistance. Furthermore, after forming the surface of an expanded synthetic resin does not have a pleasant feel. Polypropylene complexes have excellent stiffness, but are lacking with respect to formability, impact resistance, and dimensional stability. Thus, there has yet to be found a material which can satisfy all the requirements (stiffness and a suitable flexibility, lightness, dimensional stability, heat distortion resistance, and formability) for interior finish.

A method for manufacturing a nonwoven fabric having excellent elasticity is known in which a fiber made of polyethylene, polypropylene, a low-melting (140° C.) polyester, or the like is used as a fiber binder, a fibrous mat made of such a fiber binder and a synthetic fiber having a higher melting point than the fiber binder is subjected to needling, and the fibers of the upper and lower layers of the web are temporarily entangled with each other, after which the material is heated, and the fiber binder is melted and joined with the other synthetic fiber. This nonwoven fabric has good lightness and flexibility, but it has poor formability and stiffness. Therefore, while it is useful as interior finish for flat surfaces, it can not be employed for locations having a complicated shape.

Another conventional material which can be employed for the interior finish of automobiles is obtained by coating or impregnating a needle punched fabric with an aqueous emulsion of a thermoplastic resin with a softening point of 100°–130° C., after which drying by heating is performed to remove moisture and obtain a formable nonwoven fabric. The fabric is then heated and press molded to obtain an interior finish material. This material has the advantage that it can be applied to a surface having a complex shape. The fibers of this nonwoven fabric are secured by the entwinement of the fibers due to needle punching and by the adhesion of the emulsion resin to the fibers.

However, the nonwoven fabric which is coated or impregnated with the emulsion is bulky with an apparent density of 0.08–0.13 grams per cubic centimeter. Therefore, there is the disadvantage that the filler effect of the emulsion resin is poor. As the filler effect is poor, this material has poor shielding properties.

In Japanese Laid-Open Patent Application No. 58-87353, the present inventor disclosed a manufacturing method for a formable nonwoven fabric which has improved dimensional stability and stiffness, which are drawbacks of the previously-described nonwoven fabric, with no decrease in lightness, heat distortion resistance, and air permeability. In this method, a fibrous mat is employed which comprises 15–50 weight % of a thermoplastic resin fiber binder and 85–50 weight % of a synthetic or natural fiber which has a melting point which is at least 40° C. higher than that of the thermoplastic resin. After the fibrous mat is subjected to needling, it is heated to a temperature at which the thermoplastic resin fiber binder melts but the synthetic or natural fiber does not. While maintaining the thermoplastic resin fiber binder in a molten state, the fibrous mat is compress and the apparent density is adjusted to 0.15–0.50 grams per cubic centimeter. The compressed fibrous mat is then coated or impregnated with an aqueous emulsion of a thermoplastic resin whose formable temperature range is 80°–180° C. in an amount such that the resin solid content of the emulsion is 15–300 weight % with respect to the weight of the fibers in the fibrous mat. The mat is then dryed by heating to 60°–250° C. to remove moisture, thereby obtaining an nonwoven fabric.

In this method, the stiffness of the nonwoven fabric is increased by the combined use of a thermoplastic resin fiber binder and a resin emulsion. Also, the dimensional stability is increased by the bonding of the fibers to one another. Furthermore, by compressing the mat and driving out a portion of the air inside it prior to coating or impregnation of the emulsion, the packing rate of the emulsion resin inside the mat is increased, thereby increasing the stiffness of the nonwoven fabric.

However, while this formable nonwoven fabric has excellent formability, dimensional stability, and air permeability (sound absorbing properties) as well as increased stiffness, on account of its having air permeability, it is inferior with respect to its ability to shield water. Furthermore, depending on the use, a higher stiffness and resistance to water permeation are required.

As a material having superior resistance to water permeation and stiffness, the present inventor has proposed a carpet in which a foamed sheet is bonded to the back surface of a nonwoven fabric which was subjected to resin backing (Japanese Utility Model Applications No. 57-170656 and 57-195731).

However, in this method, a backing layer forming step and a bonding step for the foamed sheet are necessary. Furthermore, in order to prevent breakage due to the bending of the foamed sheet, it is necessary to laminate a non-foamed sheet to the foamed sheet. In addition, as the outer layer is a resin layer, the appearance of the carpet is not satisfactory.

In Japanese Laid-Open Patent Application No. 60-59176, the present inventor disclosed a manufacturing method for a floor carpet having formability and hot adhesion properties. In that method, a first backing material containing (A) a resing aqueous emulsion and (B) expandable polystyrene particles is coated on the back side of a web material. Components (A) and (B) are:

(A) a resin aqueous emulsion whose main component is an aqueous dispersion of a resin with a melting point of at least 80° C. (100 parts by weight in solids), and (B) expandable polystyrene particles with a particle diameter of at most 1.5 mm (10-100 parts by weight). After coating, a second backing material is coated on the surface of the first backing material. The second backing material is an aqueous emulsion of a resin having a melting point which is 50°-125° C. and which is lower than the melting point of the resin particles of aqueous emulsion (A). Next, the emulsion is dried by heating and a backing layer is formed. At the same time, the expandable polystyrene particles are expanded.

In this method, the amount of expandable polystyrene particles which are used is only a small amount, i.e., 10-100 parts by weight per 100 parts by weight of the resin in the aqueous emulsion, the foam layer is not a smooth, continuous layer, and spheres of the foam particles protrude into the back side. Therefore, the thickness of the floor carpet is not uniform, and there is the drawback that in order to uniformly bond it to a base of a material such as metal or wood, it is necessary to use a large amount of adhesive in order to fill in the valleys between the protruding foam particles and the web. Furthermore, the appearance of the back side is not satisfactory.

In addition, when it is used as a floor material for an automobile, it is too stiff to provide the elasticity which is required when it is walked upon, and when a laminated sheet employing this material is bent, cracks form in the foam layer.

Furthermore, when this material is used as a floor material for an automobile, there are problems with respect to its ability to fit irregularities in the interior surface of the automobile, which will hereinunder be referred to as its fitting ability.

In order to decrease the stiffness and increase the elasticity of a laminated sheet so as to increase its fitting ability, a resin aqueous emulsion having a low glass transition point can be used. However, in this case, the heat resistance of the laminated sheet decreases. Considering that heat from the engine is transmitted to the passenger compartment of the vehicle and that the inside of the vehicle may reach 60° C. in summer, it is not desirable to lower the glass transition point of the emulsion resin.

The present inventor found that when a crosslinking-type resin aqueous emulsion is used together with a plasticizer, a resin film having a three-dimensional network structure is formed, and a laminated sheet is obtained which has improved fitting ability and is more suitable for being walked upon with only a small decrease in heat resistance.

Furthermore, upon performing various investigations on crosslinking-type resin aqueous emulsions, it was found that when a resin aqueous emulsion of a resin which crosslinks at normal temperatures is used (see Japanese Laid-Open Patent Application Nos. 57-3850, 57-3857, and 58-96643), due to the presence of a plasticizer, the decrease in heat resistance is large, just as when a non-crosslinked resin aqueous emulsion is used. However, when a heat crosslinkable (thermosetting-type) resin aqueous emulsion is used (see Japanese Laid-Open Patent Applications Nos. 58-67762, 58-69253, 58-132051, 59-74166, 60-35059, and 60-212469), there is only a small decrease in heat resistance.

SUMMARY OF THE INVENTION

It is therefore an object of the present invention to provide a method for manufacturing a laminated sheet having improved shielding properties, heat resistance, stiffness, appearance, and resistance to cracks.

It is another object of the present invention to provide a method for manufacturing a laminated sheet to which improved fitting ability can be imparted with only a slight decrease in stiffness.

A manufacturing method for a laminated sheet in accordance with the present invention comprises:

coating a backing coating material on a base fabric (A) which is made of a material having a thermal deformation temperature of at least 150° C., the backing coating material comprising (a) a resin aqueous emulsion and (b) expandable styrene resin particles in an amount of 150-700 parts by weight per 100 parts by weight of solids of the resin aqueous emulsion (a);

stacking a base fabric (B) which is made of a material having a thermal deformation temperature of at least 150° C. on the backing coated layer to form a laminate;

compressing the laminate from one or both sides so as to impregnate base fabric (B) with a portion of the coating material; and expanding the expandable styrene resin particles and drying the resin aqueous emulsion by heating to a temperature which is higher than the softening point of the resin of the expandable styrene resin particles and which is lower than the thermal deformation temperature of the base fabrics (A) and (B), thereby forming a foam layer between the base fabrics (A) and (B).

In another form of the present invention, a method for manufacturing a laminated sheet comprises:

coating a backing coating material on a base fabric (A) which is made of a material having a thermal deformation temperature of at least 150° C., the backing coating material comprising (a) a heat crosslinkable resin aqueous emulsion, (b) expandable styrene resin particles in an amount of 150-700 parts by weight per 100 parts by weight of solids of the heat crosslinkable resin aqueous emulsion, and (c) a plasticizer in an amount of 6-30 parts by weight per 100 parts by weight of solids of the heat crosslinkable resin aqueous emulsion;

stacking a base fabric (B) which is made of a material having a thermal deformation temperature of at least 150° C. on the backing coated layer to form a laminate;

compressing the laminate from one or both sides so as to impregnate base fabric (B) with a portion of the coating material; and expanding the expandable styrene resin particles and drying and crosslinking the heat crosslinkable resin aqueous emulsion by heating to a temperature which is higher than the softening point of the resin of the expandable styrene resin particles and which is lower than the thermal deformation temperature of the base fabrics (A) and (B), thereby crosslinking the heat crosslinkable resin aqueous emulsion and forming a foam layer between base fabrics (A) and (B).

BRIEF DESCRIPTION OF THE DRAWING FIGURE

The sole figure is a schematic view illustrating the steps in the manufacturing method of the present invention. In the figure, element number 1 is base fabric (A), 2 is a coating material, 3 is base fabric (B), 4 and 4' are rolls, 5 is a heating apparatus, 6 and 6' are press rolls, and 7 is a polystyrene foam layer.

DESCRIPTION OF THE PREFERRED EMBODIMENTS

The various materials which are employed in a manufacturing method in accordance with the present invention will now be described.

Base Fabric (A)

Base fabric (A) serves as a surface layer, so a decorative material is preferable. Some examples of suitable fabrics are tufted carpet, woven fabric, a nonwoven fabric such as needle punched carpet and synthetic leather, a nonwoven fabric which is decorated by screen printing, and one of the above base fabrics which has been subjected to backing treatment.

Some suitable materials for the base fabric are natural fibers such as wool and silk, and resin fibers such as nylon, polyethylene terephthalate, polypropylene, and polyacrylonitrile.

The thermal deformation temperature of base fabric (A) and base fabric (B), which will be described further on, is preferably at least 40° C. higher than the softening point of the resin constituting the expandable styrene resin particle backing material. By choosing such a material, heat shrinkage at the time of foaming can be prevented.

When needle punched carpet or spun bonded nonwoven fabric of poor appearance which is made from scraps or reprocessed fibers is used as base fabric (A), after lamination is carried out in accordance with the present method and a laminated sheet is obtained, the surface of base fabric (A) can be decorated by bonding to it artifical leather, synthetic paper which was printed or embossed, titanium paper, polyvinyl chloride decorative paper, woven fabric, or a composite material of urethane foam and one of the above materials.

The basis weight of base fabric (A) is 50–1000 grams per square meter and preferably 80–500 grams per square meter.

Base Fabric (B)

Base fabric (B) is bonded to a base or contacts the floor, i.e., is used as the back side of interior finish. Therefore, its appearance is of no importance and it is preferably made from an inexpensive material.

Accordingly, instead of woven fabric or artificial leather, it is preferably a needle punched carpet which is made from woven or nonwoven fabric comprising a natural or synthetic fiber such as wool, nylon, polyacrylonitrile, polyacetate, or polypropylene. Spun bonded fabric or inexpensive reprocessed felt can also be used. Any of the above base fabrics which is subjected to backing treatment using a phenol resin, a synthetic resin emulsion, or latex may also be used. Glass fiber woven or nonwoven fabric may also be used. The fiber may be reprocessed fiber.

This needle punched carpet is a web which is obtained by needling a fibrous mat made of synthetic and/or natural fibers. It is manufactured by well-known manufacturing methods for nonwoven fabric. Namely, fibers of 1.2–300 denier with a fiber length of 25–150 mm are thoroughly mixed, opened ones are supplied to a web forming apparatus, and a web (the fibrous mat and/or the web) which is obtained by stacking cards formed by the mixed fibers so as to obtain the desired basis weight of the web is subjected to needling in the vertical direction. By intertwining the fibers, they become entangled.

If a portion of the fiber (15–50 weight % of the weight of the mat) is replaced by a resin fiber binder having a low melting point of 80°–160° C., the strength of the resulting laminated sheet is increased. Examples of such a fiber binder are short fibers (15–40 mm) of a resin such as polyethylene, polypropylene, linear polyester, and a low molecular weight polycondensation polyamide.

As the raw material for the synthetic fiber which constitutes the fibrous mat, a thermoplastic resin such as polyethylene terephthalate or a polyamide which has a melting point which is at least 40° C. higher and preferably at least 70° C. higher (in the range of 200°–280° C.) than the melting point of the thermoplastic resin fiber binder is used. Natural fibers which can be used include cotton, flax, and wool.

The basis weight of base fabric (B) is 10–2000 grams per square meter, depending upon the use. When it is used solely for bonding and retention of the foamed layer, the basis weight is preferably 10–100 grams per square meter. When it is used to provide cushioning and thickness, the basis weight is preferably 100–1000 grams per square meter.

Backing Material

The backing material contains at least a resin aqueous emulsion and expandable styrene resin particles. In order to obtain a smooth and continuous foam layer, the expandable styrene resin particles are used in an amount of 150–700 parts by weight and preferably 200–500 parts by weight per 100 parts by weight of the resin in the emulsion.

Expandable Styrene Resin Particles

Expandable polystyrene is obtaind by the suspension polymerization of styrene alone or styreine and a vinyl monomer such as α-methylstyrene, vinyltoluene, methyl methacrylate, butyl methacrylate, acrylonitrile, acrylic acid, or maleic anhydride. During or after polymerization, the resulting polymer particles are impreganted with a foaming agent. Examples of expandable resin particles are those comprising a styrene resin (softening point: 100°–125° C.) such as polystyrene, styrene-α-methylstyrene-acrylonitrile copolymer, styrene-α-methylstyrene-acrylonitrile-methyl methacrylate copolymer, and styrene-methyl methacrylate copolymer with a particle diameter of 0.1–2.0 mm, and preferably at most 1.5 mm, and foaming agent content of 2–15 weight %.

Resin Aqueous Emulsion

The resin aqueous emulsion serves as a backing material, fixing the fibers of the fibrous mat and bonding the foam particles. The aqueous emulsion should be one having a glass transition point of −65° to +150° C. such as a latex or aqueous emulsion of polyvinyl acetate, vinyl chloride-vinylidene chloride copolymer, styrene-butadiene copolymer, styrene-methyl methacrylate copolymer, styrene-n-butyl acrylate copolymer, ethylene-vinyl acetate copolymer, styrene-n-butyl acrylate-acrylic acid copolymer, and vinylidene chloride-acrylonitrile-acrylic acid copolymer. These resins can be used alone or in combination.

From the standpoint of the flexibility of the nonwoven fabric layer of the floor carpet, it is desirable to employ an aqueous emulsin or a latex having a glass transition point of at most 20° C. On the other hand, in order to impart stiffness and formability to the nonwoven fabric layer of the floor carpet, it is desirable to employ an aqueous emulsion having a glass transition point of at least 80° C.

A number of examples of aqueous emulsions having a glass transition point (Tg) of at least 80° C. are given below.

(a) Aqueous emulsions of homopolymers such as n-propyl polymethacrylate (Tg=81° C.), polystyrene (100° C.), polyacrylonitrile (100° C.), polymethyl methacrylate (105° C.), polymethacrylic acid (130° C.), and polyitaconic acid (130° C.).

(b) Aqueous emulsions of copolymers comprising 50-100 weight % and preferably 65-95 weight % of the vinyl monomers which are the raw materials of the above polymers with at most 50 weight % and preferably 35-5 weight % of another vinyl monomer such as 2-ethylhexyl acrylate (Tg=−85° C.), n-butyl acrylate (−54° C.), ethyl acrylate (−22° C.), isopropyl acrylate (−5° C.), 2-ethylhexyl methacrylate (−5° C.), n-propyl acrylate (8° C.), n-butyl methacrylate (20° C.), vinyl acetate (30° C.), ethyl methacrylate (65° C.), and vinyl chloride (79° C.) or vinyldiene chloride (−18° C.). The glass transition point Tg for the substances in cartegory (b) is the glass transition point for a homopolymer of these vinyl monomers or of vinylidene chloride.

(c) A mixture of 50-97 weight % and preferably 55-95 weight % of an aqueous emulsion having a glass transition point of 80°-155° C. with 50-3 weight % and preferably 45-5 weight % of a resin aqueous emulsion having a glass transition point of −85° C. to less than +80° C.

The resin solids content of the aqueous emulsion is normally 20-60 weight %, and the radius of the dispersed resin particles is at most 10 microns and preferably 0.05-1.0 microns.

Examples of resin aqueous emulsions having a glass transition point of at most 20° C. are emulsified polymers such as (i) a monomer selected from 2-ethylhexyl acrylate, n-butyl acrylate, ethyl acrylate, isopropyl acrylate, 2-ethylhexyl methacrylate, n-propyl acrylate, n-butyl methacrylate, vinylidene chloride, ethylene, and butadiene 20-100 weight %

(ii) a monomer selected from vinyl acetate, ethyl methacrylate, vinyl chloride, n-propyl methacrylate, styrene, acrylonitrile, methyl methacrylate, acrylic acid, itaconic acid, acrylamide, and methacrylamide at most 80 weight %

(iii) a monomer selected from diacetone acrylamide, maleic anhydride, and diethylene glycol diacrylate 0-5 weight %

In order to impart body to the resulting nonwoven fabric, an inorganic filler or pigment such as calcium carbonate, iron oxide, ferrite, or barium sulfate may be blended into the emulsion.

In order to obtain a smooth continuous foam layer and to carry out foaming in a smooth manner, it is necessary that the film-forming temperature of the resin in the aqueous emulsion be lower than the foaming temperature of the expandable styrene resin particles ad preferably lower than the softening point of the expandable resin particles. The foam particles are bonded together by the emulsion resin and form a continuous foam layer.

The coating of the backing material on base fabric (A) or (B) can be performed by spraying, by immersion, by a brush, a foam coating machine, rolls, or the like. The coating weight of the backing material is 100-1700 grams per square meter (solids) and preferably 300-1300 grams per square meter. Coating is preferably performed using the foam coating method. If the resin emulsion is expanded by 3 to 7 times, the ease of coating is increased and the coating weight and thickness can be easily controlled.

In addition to functioning as an adhesive for the foam particles, the resin aqueous emulsion acts as a carrier when coating the expandable resin particles on base fabric (A). It also acts as an adhesive between base fabrics (A) and (B) and the foam layer and imparts flexibility and stiffness to the base fabric.

Heat Crosslinkable Resin Aqueous Emulsion

A resin aqueous emulsion of a resin having a glass transition point of 80°-140° C. after heat crosslinking is used as a heat crosslinkable resin aqueous emulsion which entangles the fibrous mat and serves as an adhesive for the foam particles. Some typical examples of this emulsion are given below.

(1) A blend of a copolymer aqueous emulsion and 2-20 parts of a water-soluble aminoplast per 100 parts by weight of solids of the copolymer aqueous emulsion, the copolymer aqueous emulsion being obtained by the emulsion polymerization of a vinyl monomer mixture of 3-10 weight % of a vinyl monomer including a hydroxyl group as a thermosetting functional group, such as 2-hydroxyethyl acrylate, 2-hydroxypropyl acrylate, polyethylene glycol monomethacrylate, polypropylene glycol monomethacrtylate, and 97-90 weight % of another vinyl monomer, (2) A self-crosslinking resin aqueous emulsion obtained by the emulsion polymerization of a vinyl monomer mixture of 1-10 weight % of N-methylolacrylamide and/or N-methylolamide as a thermosetting functional group, and 99-90 weight % of another vinyl monomer.

(3) A blend of 100 parts by weight (solids) of the resin aqueous emulsion of (2) with 2-20 parts by weight of a water soluble aminoplast.

(4) A mixture of the emulsions of (1) and (2).

Examples of other vinyl monomers are (i) a monomer selected from 2-ethylhexyl acrylate, n-butyl acrylate, ethyl acrylate, isopropyl acrylate, 2-ethylhexyl methacrylate, n-propyl acrylate, n-butyl methacrylate, vinylidene chloride, ethylene, and butadiene at least 20 weight %

(ii) a monomer selected from vinyl acetate, ethyl methacrylate, vinyl chloride, n-propyl methacrylate, styrene, acrylonitrile, methyl methacrylate, acrylamide, and methacrylamide at most 80 weight %

(iii) an $\alpha,\beta$-unsaturated carboxylic acid selected from acrylic acid, itaconic acid, methacrylic acid, maleic acid, fumaric acid, and acid anhydrides thereof 0-5 weight %

The resin solids content of the aqueous emulsion is normally 20-60 weight %. The diameter of the dispersed resin particles is at most 10 microns and preferably 0.05-1.0 microns.

In order to impart body to the resulting nonwoven fabric, an inorganic filler or pigment such as calcium carbonate, iron oxide, ferrite, or barium sulfate may be blended into the emulsion.

In order to obtain a smooth and continuous foam layer and to carry out foaming in a smooth manner, it is necessary that the film-forming temperature (MFT) of the resin aqueous emulsion prior to crosslinking be lower than the foaming temperature of the expandable styrene resin particles and preferably lower than the softening point of the expandable resin particles. The foam particles are bonded together by the emulsion resin and form a continuous foam layer.

In addition to functioning as an adhesive for the foam particles, the heat crosslinkable resin aqueous emulsion acts as a carrier when coating the expandable resin particles on base fabric (A). It also acts as an adhesive between base fabrics (A) and (B) and the foam layer and imparts stiffness to the base fabrics.

Plasticizer

Examples of a plasticizer which can be used to plasticize the emulsion resin and impart elasticity to the foam layer of the laminated sheet are dioctyl phthalate, dibutyl phthalate, epoxidized linseed oil, dibutyl, benzyl phthalate, chlorinated paraffin, resin-type plasticizers (such as "Plastolit DS-3060", which is a trade name of BASF), and phosphorus plasticizers.

The amount of plasticizer which is used is 6-30 parts by weight per 100 parts by weight of resin solids in the heat crosslinkable resin aqueous emulsion.

If less than 6 parts by weight are used, the plasticizing effect is poor, and the improvement in fitting ability and elasticity is inadequate. On the other hand, if more than 30 parts by weight are used, the stiffness and heat resistance of the laminated sheet decrease.

The coating of the backing material on base fabric (A) or (B) can be performed by spraying, by immersion, by a brush, a foam coating machine, rolls, or the like. The coating weight of the backing material is 100-1700 grams per square meter (solids) and preferably 300-1300 grams per square meter. Coating is preferably performed using the foam coating method. If the heat crosslinkable resin emulsion is expanded by 3 to 7 times, the ease of coating is increased and the coating weight and thickness can be easily controlled.

EXAMPLES

Manufacturing Method for a Laminated Sheet

A backing coating material containing (a) the above-described resin aqueous emulsion and (b) the above-described expandable resin particles or (a) the above-described heat crosslinkable resin aqueous emulsion, (b) the above-described expandable resin particles, and (c) the above-described plasticizer is coated on the surface of base fabric (A) or (B), and then base fabric (B) or (A) is stacked on the coated surface to obtain a laminate. This laminate is then pressed from one or both sides using nip rolls, a press, or the like to impregnate the base fabrics (A) and (B) with the emulsion. Then, the expandable resin particles are expanded by heating the laminate to a temperature which is higher than the melting point of the expandable resin particles but lower than the thermal deformation temperature of the base fabrics (A) and (B). The heating also serves to drive off moisture in the resin aqueous emulsion. As shown in FIG. 1, the base fabrics (A) and (B) are integrally bonded to the front and back sides of a foam layer (E) to form a laminated strip (S). It is also possible to first heat the laminate to a temperature at which moisture can be removed from the emulsion without expanding the expandable resin particles (such as about 90° C.), and then raise the temperature to one suitable for foaming.

When using expandable polystyrene particles (Tg=104° C.) with a base fabric of polyester (melting point=about 240° C.) or polypropylene (melting point=164° C.), the drying temperature is set at 110-140° C.

The drying of the coated emulsion by heating and the expansion of the expandable resin particles can be performed by any desired method. A heating cylinder, and infrared heater, a hot air dryer, a suction dryer, and the like can be employed for this purpose, but it is preferable to use a hot air dryer. When using a heat crosslinkable resin emulsion, all or a part of the heat crosslinkable resin is crosslinked by the heating.

The expandable resin particles are expanded by 2-50 times by this heating. The particles become foam particles with a particle diameter of 0.5-4.5 mm. or a portion of the particles fuse to form a foam sheet. Of course, the film of the resin of the emulsion forms the foam particles into a continous foam (E).

This foam layer imparts heat resistance, formability, stiffness, and shielding properties to the laminated sheet. On account of the present of this foam layer, a laminated sheet of the present invention has greatly improved stiffness, heat resistance, and shielding properties.

If the laminated sheet is heated to a temperature at which the foam softens and melts, the laminated sheet can be formed into a desired shape and thickness by press forming.

As both surfaces of the foam layer are covered by the base fabrics, the foam layer does not produce a chafing sound, and the resistance of the foam layer to bending damage is increased. Furthermore, the bonding ability of the laminatd sheet to other materials is excellent.

When manufacturing this laminated sheet, the backing coating material is sandwiched between base fabrics (A) and (B) and is compressed so as to form a smooth foam layer.

The heat crosslinkable resin which serves as binder is crosslinked when heating the emulsion to dry it during the manufacture of the laminated sheet or when heating the laminated sheet while performing press forming. Accordingly, there is only a small decrease in the heat resistance of the foam layer.

The present invention will now described in greater detail by means of the following examples.

EXAMPLE OF MANUFACTURING A NEEDLE PUNCHED CARPET

Nonwoven Fabric for Base Fabric (A)

Fabric A-1

The front side of a plain-type needle punched carpet (80% polyester fibers) comprising polyesater fibers and 200 grams per square meter of polypropylene fibers was printed by screen printing.

Fabric A-2

Excenu (trade name of a synthetic leather manufactured by Toray Industries, heat resistance of at least 160° C.) was employed.

Fabric A-3

Tufted carpet comprising polyester nonwoven fabric on a ground fabric of which nylon was applied was used (basis weight=450 grams per square meter).

Fabric A-4

A plain-type needle punched carpet comprising polyester fibers (basis weight=300 grams per square meter) on which were applied 100 grams per square meter (dry solids) of Acronal 295DN (trade name of a resin aqueous emulsion manufactured by Mitsubishi Yuka Badishe Co., Ltd., solid content=50%, MFT=20° C.) for backing treatment was used.

Nonwoven Fabric for Base Fabric (B)

Fabric B-1

A fibrous mat (150 grams per square meter) comprising randomly stacked 15-denier polyester fiber scraps with a fiber length of approximately 100 mm and polypropylene fiber (melting point=164° C.) was subjected to needling (50 holes per square inch) using a 15-18-32-3RB needle. It was then heated to 200° C. and cold pressed to obtain a needle punched carpet (80% polyester fibers) with a thickness of approximately 1 mm.

Resin Aqueous Emulsion

Emulsion E-1: Acronal S-886S

This is a crosslinking-type styrene-ester acrylate copolymer aqueous emulsion manufactured by Mitsubishi Yuka Badishe Co., Ltd., (film-forming temperature=20° C., Tg of crosslinked resin=approximately 110° C., solids content=50 weight %).

Emulsion E-2: Acronal YJ-1100D

This is a non-crosslinking styrene-acrylic acid lower alkyl ($C_2-C_8$) ester copolymer aqueous emulsion manufactured by Mitsubishi Yuka Badishe Co., Ltd. (Tg=55° C., solids contents=46 weight %)

Emulsion E-3: Diofan 192D

This is a non-crosslinking vinylidene chloride copolymer aqueous emulsion manufactured by Mitsubishi Yuka Badishe Co., Ltd. (Tg=20° C., solids content=55 weight %).

Emulsion E-4

Manufacturing Example of a Resin Aqueous Emulsion Which Crosslinks at Room Temperature After Drying The following raw materials were charged into a reaction vessel equipped with a temperature regulator, an anchor-type stirrer, a reflux condenser, a supply vessel, a thermometer, and a pipe for introducing nitrogen.

water: 200 parts
35% aqueous solution of a sodium salt (anionic emulsifier) of a sulfuric acid half ester of p-nonyl phenol which was reacted with 20 moles of ethylene oxide: 5 parts
20% solution of p-nonyl phenol (nonionic emulsifier) reacted with 25 moles of ethylene oxide: 20 parts The following mixture was used as feed stock I.
water: 200 parts
35% solution of the above-described anionic emulsifier: 25 parts
styrene: 240 parts
2-ethylhexyl acrylate: 215 parts
acrylic acid: 10 parts
acrolein: 25 parts
acrylamide: 10 parts As feed stock II, a solution of 2.5 parts of potassium persulfate in 85 parts of water was prepared.

After the air inside the reaction vessel was replaced with nitrogen gas, 10% of feed stock I was added to the charge, and the mixture was heated to 90° C. Next, 10% of feed stock II was poured into the reaction vessel. The remainder of feed stock I and feed stock II was supplied in the same manner over a period of 3 to 3.5 hours. After the feed stocks were supplied, the temperature was maintained at 90° C. for 1.5 hours, after which the reaction vessel was cooled to room temperature. The pH of the dispersion was adjusted to 7-8 using ammonia water, 8 parts of adipic acid di-hydrazide were added, and stirring was performed for approximately 1 hour.

In this manner, a resin aqueous emulsion was obtained which crosslinks at normal temperature and which had a solids content of 50%.

Emulsion E-5

Method of Manufacturing a Heat Crosslinkable Resin Aqueous Emulsion

A vinyl monomer mixture was prepared from the following components. All amounts are in parts by weight.
styrene: 47.5 parts
butyl acrylate: 40 parts
ethylene glycol monomethacrylate: 10 parts
acrylamide: 1.5 parts
acrylic acid: 1.0 parts This mixture was subjected to emulsion polymerization in the same manner as in manufacturing example E-4. A heat crosslinkable resin aqueous emulsion having a solids content of 50 weight %, a viscosity of 2800 cps, a pH of 8.0, and a MFT of 25° C. was obtained.

Emulsion E-6

Manufacturing Example of a Heat Crosslinkable Resin Emulsion

A vinyl monomer mixture was prepared from the following components. All amounts are in parts by weight.
methyl methacrylate: 45 parts
butyl acrylate: 47.5 parts
N-methylol acrylamide: 5 parts
acrylic acid: 2.5 parts This mixture was subjected to emulsion polymerization in the same manner as in manufacturing example E-4. A heat crosslinkable resin aqueous emulsion having a solids content of 50 weight %, a pH of 6.0, and an MFT of 20° C. was obtained.

Example 1

A backing coating material having the following composition was coated on the unprinted side of needle punched carpet A-1 (basis weight=200 grams per square meter).
 (a) Acronal S-886S: 200 parts by weight
 (b) expandable polystyrene particles (containing 5.5 weight % of butane) having an average particle diameter of 0.33 mm 400 parts by weight The coated weight in solids was 700 grams per square meter. Then, base fabric (B) (needle punched carpet B-1) was immediately stacked atop it, pressing was performed from both sides using rolls, and nonwoven fabrics on both sides were impregnated with the emulsion. Then, hot air at 130° C was blown for 15 minutes onto the side of the resulting laminate formed by needle punched carpet B-1 to get rid of moisture and to expand the expandable polystryene particles. A laminated sheet was obtained which had a continuous polystyrene foam layer with a bulk density of approximately 0.14 grams per cubic centimeter and a particle diameter of at most 1.0 mm.

The thickness of base fabric (A-1) was approximately 2 mm, the thickness of the foam layer was approximately 5 mm, and the thickness of base fabric (B-1) was approximately 1 mm.

The laminated sheet was heated to 180° C. for 60 seconds in a far infrared oven to adequately soften the resin of the backing material and the polystyrene foam. Then, using a cold press mold, molding was preformed at a pressure of 20 kg per square cm for one minute to obtain a carpet for the floor of the interior of an automobile.

Comparative Example 1

A floor carpet was obtained by a procedure similar to that of Example 1 using a resin emulsion between the upper and lower layers of nonwoven fabric, but without using expandable polystyrene particles. The finished thickness was 3mm, layer A was 2mm, and layer B was 1mm. The floor carpet was molded to obtain carpet for the floor of the interior of an automobile. The properties of the carpet of Example 1 and Comparative Example 1 are given in Table 1. The methods used for evaluating the carpet properties are discribed below.

Three-Point Bending Strength

A test piece (150 mm long by 50 mm wide) was supported across a 100 mm span. Using an Instron-type tester, a vertical load was applied to the center of the test piece to produce deformation at a rate of 50 mm per minute. The maximum bending resistance was measured.

Resistance to Water Permeation

Water permeability was meansured in accordance with JIS A-6910 water permeability test. A head of water of 250 mm was employed, and measurement was performed after 12 hours. Evaluation was as follows.
 x: water penetrated through the rear surface and did not remain within the carpet
 Δ: water smudges on the rear surface
 o: no water smudges on the rear surface Bonding Strength Test piece: 150 mm long × 30 mm wide
The peeling strength of the foam layer and base fabric (A) was measured using an Instron-type tester at a speed of 50 mm per minute.

Stiffness

The automobile floor carpet was bent by 90° and was evaluated as follows.
 o: carpet was hard, had large bending resistance, broke
 Δ: carpet was hard, but bent without breaking and easily fit the floor of an automobile
 x: carpet had no resistance to bending, easily fit the floor of an automobile Heat Resistance A carpet for the floor of an automobile which was obtained by press molding was maintained at 85° C. for 48 hours, and the degree of deformation of the carpet was evaluated as follows.
 ⊚: no deformation
 o: slight deformation
 Δ: large deformation
 x: extreme deformation Elasticity The carpet was rolled into a tubular shape with a diameter of 50 mm, after which the load on the carpet was released. The elasticity was evaluated as follows.
 o: rolls without breaking, returns to inital shape
 Δ: rolls without breaking, but does not return to intial shape
 x: breaks upon rolling Mold Fidelity Mold Fidelity was evaluated as follows.
 ⊚: good
 o: some deformation
 x: large return after press molding

TABLE 1

|  | Carpet | | | | | |
|---|---|---|---|---|---|---|
|  | Bending Strength | Resistance to Water Permeation | Mold Fidelity | Stiffness | Shrinkage at 85 C for 24 Hrs | Adhesion to Nonwoven Fabric (kg/3 cm width) |
| Example 1 | 2.8 kg/ 5 cm width |  | good | good | none | 2.54 |
| Comparative Example 1 |  | x | good | weak | none | — |

Examples 2-3

Example 1 was repeated with the exception that the needle punched carpet (A-1) was replaced by artificial leather (A-2) and tufted carpet (A-3), respectively. A laminated sheet having excellent bending strength, resistance to water permeation, mold fidelity, and stiffness was obtained.

In Example 2 using artificial leather, the laminate was pressed from both sides.

Examples 4-5

Example 1 was repeated with the exception that the mixing ratio of solids of Acronal S-886S to expandable polystyrene particles (EPS) was 100 parts:200 parts for Example 4 and 100 parts:700 parts for Example 5. The characteristics of the resulting laminate are shown in Table 2.

Examples 6-7

Example 1 was repeated with the exception that instead of Acronal S-886S, Acronal YJ1100 and Diofan 192D, respectively, were used as a resin aqueous emulsion. The physical properties of the resulting laminated sheet are shown in Table 2.

Example 8

200 parts by weight of Acronal S-886S were used as a resin aqueous emulsion. The fabric of A-4 was used as a nonwoven fabric for base fabric (A). Under Felt (1000 grams per square meter) using phenol for vehicles and the like was employed as a nonwoven fabric for base fabric (B), and a mixture of expandable styrene-α-methylstyrene copolymer particles and Heat Pore (trade name) made by Mitsubishi Yuka Badishe Co., Ltd. (Tg of approximately 115° C.) was used as an expandable resin, the mixture containing 200 parts by weight of particles with a diameter of at most 0.5 mm and 100 parts by weight of particles with a diameter of 1.0 mm (300 grams per square meter were coated as a foam layer). The procedure was otherwise the same as for Example 1, and a floor carpet was obtained with a foam layer thickness of 1.5 mm. The bending strength was 0.68 kg per 5 cm of width, but the formability, resistance to water permeation, shrinkage factor at 100° C., and adhesion to both nonwoven fabrics were good.

The properties of Example 1 and Examples 4-9 of a laminated carpet are given in Table 2.

Example 9

The procedure of Example 1 was repeated, except drying was performed at 95° C. for 20 minutes. After water was driven off, heating was performed in a hot air oven at 130° C. for 50 seconds and foaming was performed.

As a result, in the same manner as in Example 1, a foam layer with a thickness of 5 mm was obtained. There were no differences in formability, resistance to water permeation, or stiffness from the carpet of Example 1.

Example 10

The procedure of Example 8 was repeated with the exception that the coating weight of a coating material comprising Acronal S-886S and expandable styrene-α-methylstyrene copolymer particles was 700 grams per square meter. Molding was performed to obtain a floor carpet with a foam layer thickness of approximately 5 mm.

The bending strength of the carpet was 2.67 kg per 5 cm of width.

Comparative Example 2

Example 1 was repeated with the exception that base fabric (B) was not used. The back surface was not smooth, so during drying and foaming, the foam layer became irregular, and the laminate greatly curled towards the side of base fabric (A).

Furthermore, the foam was random, so the front surface was irregular.

When subjected to a three-point bending test, the sample soon broke and had a strength of only 0.26 kg per 5 cm of width.

Example 11

The procedure of Example 1 was used to obtain a floor carpet for the interior of an automobile with the exception that the following composition was used as a coating material for backing.

(a) Acronal S-886S: 200 parts by weight
(b) expandable polystyrene particles (containing 5.5 weight % butane) with an average particle diameter of 0.33 mm

TABLE 2

| | Examples | | | | | |
|---|---|---|---|---|---|---|
| | 1 | 4 | 5 | 6 | 7 | 8 |
| Backing Agent Composition | | | | | | |
| Emulsion Acronal S-886S | 100 | 100 | 100 | — | — | 100 |
| (solids) Acronal YJ-1100D | — | — | — | 100 | — | — |
| (parts) Diofan 192D | — | — | — | — | 100 | — |
| Expandable Styrene Particles (parts) | Styropore 400 | Styropore 200 | Styropore 700 | Styropore 400 | Styropore 400 | Heat Pore 300 |
| LAMINATED SHEET | | | | | | |
| Thickness of Base Fabric A-1 (mm) | 2 | 2 | 2 | 2 | 2 | |
| Thickness of Foam Layer (mm) | 5 | 4.5 | 8 | 5 | 5 | 1.5 |
| Thickness of Base Fabric B-1 (mm) | 1 | 1 | 1 | 1 | 1 | |
| Bending Strength (kg/5 cm width) | 2.80 | 1.86 | 2.25 | 1.57 | 0.86 | 0.68 |
| Resistance to Water Permeation | | | | | | |
| Mold Fidelity | good | good | good | good | good | good |
| Stiffness | good | good | good | good | good | good |
| Shrinkage at 85° C. | ≦0.5% | ≦0.5% | ≦0.5% | | ≦0./5% | ≦0.5% |
| Smoothness of Foam Layer | good | good | good | good | good | good |
| Adhesion to Nonwoven Fabric (kg/3 cm width) | 2.54 | 2.98 | 1.45 | 1.82 | 1.24 | 2.38 |

400 parts by weight (c) dibutyl benzyl phthalate 20 parts by weight

Comparative Example 3

Using the same procedure as for Example 11, a floor carpet was obtained using a resin emulsion between the upper and lower layers of nonwoven fabric but without using expandable resin particles. The finished thickness was approximately 3 mm, layer (A) was approximately 2 mm, and layer (B) was approximately 1 mm. Molding was then performed to obtain a floor carpet for the interior of an automobile.

Comparative Example 4

A carpet for the floor of the interior of an automobile was obtained in the same manner as in Example 11 except that component (C) (dibutylbenzyl phthalate plasticizer) was not included in the coating material for backing.

Comparative Example 5

A carpet for the floor of the interior of an automobile was obtained in the same manner as for Example 11 with the exception that instead of the heat crosslinkable resin aqueous emulsion S-886, resin aqueous emulsion E-5 was employed.

Comparative Example 6

A carpet for the floor of the interior of an automobile was obtained in the same manner as for Example 11 except that instead of the heat crosslinkable resin aqueous emulsion, resin aqueous emulsion E-4 which crosslinks at room temperature was used as a coating material.

Comparative Example 7

A carpet for the floor of the interior of an automobile was obtained in the same manner as for the Example 11 except that a mixture of 200 parts by weight of Acronal YJ-1100D and 400 parts by weight of Sytropore was used as a coating material for backing.

Example 12

A carpet for the floor of the interior of an automobile was obtained in the same manner as for Example 1, with the exception that instead of the heat crosslinkable resin aqueous emulsion S-886, heat crosslinkable resin emulsion E-6 was employed as a coating material for backing.

Example 13

A carpet for the floor of the interior of an automobile was obtained in the same manner as for Example 11 with the exception that a blend of 100 parts of heat crosslinkable resin aqueous emulsion E-5 and 10 parts of "MD-101" (trade name of a water-soluble melamine resin manufactured by Sumitomo Chemical Co.) was used as component (a).

Example 14

A carpet for the floor of the interior of an automobile was obtained in the same manner as for Example 11 with the exception that a blend of 100 parts of heat crosslinkable resin aqueous emulsion E-5 and 6 parts of "MD-101" (trade name of a water-soluble melamie resin manufactured by Sumitomo Chemical Co.) was used as component (a).

The properties of the carpets of Examples 11–14 and Comparative Examples 3–7 are given in Table 3.

TABLE 3

| | Bending Strength (kg/5 cm width) | Resistance to Water Permeation | Mold Fidelity | Stiffness | Elasticity | Heat Resistance | Adhesion to Nonwoven (kg/3 cm width) |
|---|---|---|---|---|---|---|---|
| Example 11 | 0.15 | | | Δ | | | 2.32 |
| Comp. Example 3 | 0 | x | Δ | x | Δ | Δ | — |
| Comp. Example 4 | 2.8 | x | | | x | | 2.54 |
| Comp. Example 5 | 0.10 | | Δ | Δ | Δ | x | 1.85 |
| Comp. Example 6 | 0.11 | | Δ | Δ | Δ | x | 2.21 |
| Comp. Example 7 | 1.57 | | Δ | Δ | Δ | x | 1.82 |
| Example 12 | 0.17 | | | Δ | | | 2.30 |
| Example 13 | 0.15 | | | Δ | | | 2.43 |
| Example 14 | 0.20 | | | | | | 2.51 |

Examples 15–16

A laminated sheet was prepared in the same manner as for Example 11 with the exception that instead of needle punched carpet A-1, synthetic leather A-2 and tufted carpet A-3 were respectively employed. The resulting laminated sheet had excellent bending strength, resistance to water permeation, mold fidelity, stiffness, fitting ability, and heat resistance.

In Example 15 using synthetic leather, the laminate was pressed from both sides.

Examples 17–18

A laminated sheet was obtained in the same manner as for Example 11 except that the mixing ratio of solids of Acronal S-886S to expanded polyester particles (ESP) was 100 parts:200 parts for Example 17 and 100parts:700 parts for Example 18. The properties of the resulting laminated sheets are shown in Table 3.

Example 19

200 parts by weight of Acronal S-886S were used as a resin aqueous emulsion. Fabric A-4 was used as an nonwoven fabric for base fabric (A). Under Felt (1000 grams per square meter) using phenol for vehicles and the like was employed as a nonwoven fabric for base fabric (B), and a mixture of expandable styrene-methylstyrene copolymer particles and Heat Pore made by Mitsubishi Yuka Badishe Co., Ltd. (Tg of approximately 155° C.) was used as an expandable resin, the mixture containing 200 parts by weight of particles with a diameter of at most 0.5 mm and 100 parts by weight of particles with a diameter of 1.0 mm (300 grams per square meter were coated as a foam layer). The procedure was otherwise the same as for Example 11, and a floor carpet was obtained with a foam layer thickness of 1.5 mm. The bending strength was 0.13 kg per 5 cm of width, but the formability, heat resistance, adhesion to both nonwoven fabrics, and ability to be walked upon were good.

Example 20

The procedure of Example 19 was repeated with the exception that the coating weight of a coating material comprising Acronal S-886S and expandable styrene-α-methylstyrene copolymer particles was 700 grams per square meter. Molding was performed to obtain a floor carpet with a foam layer thickness of approximately 5 mm.

The bending strength of the carpet was 0.17 kg per 5 cm of width.

The properties of the laminated carpets of Examples 15-20 are shown in Table 4.

Example 21

The procedure of Example 1 was repeated except that drying was performed at 95° C. for 20 minutes. After water was driven off, heating was performed in a hot air oven at 130° C. for 50 seconds and foaming was performed.

As a result, in the same manner as in Example 11, a foam layer with a thickness of 5 mm was obtained. There were no differences in formability, resistance to water permeation, or stiffness from the carpet of Example 11.

TABLE 4

| | Examples | | | | | |
|---|---|---|---|---|---|---|
| | 15 | 16 | 17 | 18 | 19 | 20 |
| Backing Agent Composition | | | | | | |
| Acronal S-886 (parts) | 200 | 200 | 200 | 200 | 200 | 200 |
| Expandable Polystyrene Particles (parts) | SP 400 | SP 400 | SP 200 | SP 700 | HP 300 | HP 300 |
| Plasticizer (parts) | BBP 20 | BBP 20 | BBP 20 | BBP 20 | DOP 10 | DOP 10 |
| LAMINATED SHEET | | | | | | |
| Thickness of Base Fabric A-1 (mm) | — | — | 2 | 2 | — | — |
| Thickness of Base Fabric A-2 (mm) | 5 | 5 | — | — | — | — |
| Thickness of Base Fabric A-3 (mm) | — | — | — | — | 1.5 | 1.5 |
| Thickness of Foam Layer (mm) | 5 | 5 | 4.5 | 8 | 5 | 5 |
| Thickness of Tufted Carpet A-3 (mm) | — | 1 | — | — | — | — |
| Thickness of Base Fabric B-1 (mm) | 1 | — | 1 | 1 | — | — |
| Under Felt | — | — | — | — | 9 | 9 |
| Bending Strength (kg/5 cm width) | 0.17 | 0.17 | 0.1 | 0.25 | 0.13 | 0.17 |
| Resistance to Water Permeation | | | | | — | |
| Mold Fidelity | | | | | | |
| Stiffness | Δ | Δ | x-Δ | Δ- | Δ | Δ- |
| Heat Resistance | | | | | | |
| Elasticity | | | | Δ- | | Δ- |
| Adhesion to Nonwoven Fabric (kg/3 cm width) | 2.15 | 2.15 | 2.45 | 2.05 | 2.25 | 2.42 |

SP: expandable polystyrene particles (Styropore)
HP: expandable styrene-α-methylstyrene copolymer particles (Heat Pore)

What is claimed is:

1. A manufacturing method for a laminated sheet comprising:
   coating a backing coating material on a base fabric (A) which is made of a material having a thermal deformation temperature of at least 150° C., the backing coating material comprising
   (a) a heat crosslinkable resin aqueous emulsion and
   (b) 150-700 parts by weight of expandable styrene resin particles per 100 parts by weight of solids of said resin aqueous emulsion (a);
   stacking a base fabric (B) which is made of a material having a thermal deformation temperature of at least 150° C. on the layer of backing coating material to form a laminate;
   compressing said laminate from at least one side so as to impregnate base fabric (B) with a portion of said coating material; and
   expanding said expandable styrene resin particles and drying said styrene-acrylic copolymer aqueous emulsion by heating to a temperature which is higher than the softening point of the resin of said expandable styrene resin particles and which is lower than the thermal deformation temperature of base fabrics (A) and (B), thereby expanding said expandable styrene resin particles and forming a foam layer between base fabrics (A) and (B)

2. A manufacturing method for a laminated sheet comprising:
   coating a backing coating material on a base fabric (A) which is made of a material having a thermal deformation temperature of at least 150° C., the backing coating material comprising
   (a) a styrene-acrylic lower alkyl ester copolymer aqueous emulsion and
   (b) 150-170 parts by weight of expandable styrene resin particles per 100 parts by weight of solids of said styrene-acrylic copolymer aqueous emulsion (a);
   stacking a base fabric (B) which is made of a material having a thermal deformation temperature of at least 150° C. on the layer of backing coating material to form a laminate;
   compressing said laminate from at least one side so as to impregnate base fabric (B) with a portion of said coating material; and
   expanding said expandable styrene resin particles and drying said styrene-acrylic copolymer aqueous emulsion by heating to a temperature which is higher than the softening point of the resin of said expandable styrene resin particles and which is lower than the thermal deformation temperature of base fabrics (A) and (B), thereby expanding said expandable styrene resin particles and forming a foam layer between base fabrics (A) and (B)

least 150° C. on the layer of backing coating material to form a laminate;

compressing said laminate from at least one side so as to impregnate base fabric (B) with a portion of said coating material; and expanding said expandable styrene resin particles and drying said heat crosslinkable resin aqueous emulsion by heating to a temperature which is higher than the softening point of the resin of said expandable styrene resin particles and which is lower than the thermal deformation temperature of base fabrics (A) and (B), thereby expanding said expandable styrene resin particles and forming a foam layer between base fabrics (A) and (B).

3. A manufacturing method as claimed in claim 2, wherein said backing coating material further comprises 6-30 parts by weight of a plasticizer.

4. A manufacturing method as claimed in claim 2 or claim 3, wherein said heat crosslinkable resin aqueous emulsion is a blend of a water soluble aminoplast and an emulsion of a resin containing at least one of a hydroxyl group, a carboxyl group, and a glycidyl group.

5. A manufacturing method as claimed in claim 2 or claim 3, wherein said heat crosslinkable resin aqueous emulsion is an emulsion of a resin containing a methylol group.

6. A manufacturing method as claimed in claim 2 or claim 3, wherein said heat crosslinkable resin aqueous emulsion is a blend of a water soluble aminoplast and an emulsion of a resin containing a methylol group.

7. A manufacturing method as claimed in claim 2 or claim 3, wherein said heat crosslinkable resin aqueous emulsion is an emulsion of a mixture of copolymer particles containing a hydroxyl groups and copolymer particles containing a methylol group.

8. A manufacturing method for a laminated sheet comprising:

coating a backing coating material on a base fabric (A) which is made of a material having a thermal deformation temperature of at least 150° C., and which has a thickness of 0.5-10 mm, the backing coating material comprising
(a) a resin aqueous emulsion and
(b) 150-700 parts by weight of expandable styrene resin particles per 100 parts by weight of solids of said resin aqueous emulsion (a);

stacking a base fabric (B), which is made of a material having a thermal deformation temperature of at least 150 ° C. and a thickness of 0.1-10 mm, on the layer of backing coating material to form a laminate;

compressing said laminate from at least one side so as to impregnate base fabric (B) with a portion of said coating material; and expanding said expandable styrene resin particles and drying said resin aqueous emulsion by heating to a temperature which is higher than the softening point of the resin of said expandable styrene resin particles and which is lower than the thermal deformation temperature of base fabrics (A) and (B), thereby expanding said expandable styrene rein particles and forming a foam layer between base fabrics (A) and (B) having a thickness of 1.0-20 mm.

9. A manufacturing method for a laminated sheet comprising:

coating a backing coating material on a base fabric (A) which is made of a material having a thermal deformation temperature of at least 150° C., and a basis weight of 50-1,000 grams per square meter, the backing coating material comprising
(a) a resin aqueous emulsion and
(b) 150-700 parts by weight of expandable styrene resin particles per 100 parts by weight of solids of said resin aqueous emulsion (a);

stacking a base fabric (B) which is made of a material having a thermal deformation temperature of at least 150° C. and having a basis weight of 10-2,000 grams per square centimeter, onto the layer of backing coating material to form a laminate;

compressing said laminate from at least one side so as to impregnate base fabric (B) with a portion of said coating material; and expanding said expandable styrene resin particles and drying said resin aqueous emulsion by heating to a temperature which is higher than the softening point of the resin of said expandable styrene resin particles and which is lower than the thermal deformation temperature of base fabrics (A) and (B), thereby expanding said expandable styrene resin particles and forming a foam layer between base fabrics (A) and (B).

10. A manufacturing method for a laminated sheet comprising:

coating a backing coating material on a base fabric (A) which is made of a material having a thermal deformation temperature of at least 150° C., the backing coating material comprising
(a) a crosslinkable resin aqueous emulsion which is crosslinked at a temperature in the range of approximately 10-30° C. and
(b) 150-700 parts by weight of expandable styrene resin particles per 100 parts by weight of solids of said resin aqueous emulsion (a);

stacking a base fabric (B) which is made of a material having a thermal deformation temperature of at least 150° C. on the layer of backing coating material to form a laminate;

compressing said laminate from at least one side so as to impregnate base fabric (B) with a portion of said coating material; and expanding said expandable styrene resin particles and drying said crosslinkable resin aqueous emulsion by heating to a temperature which is higher than the softening point of the resin of said expandable styrene resin particles and which is lower than the thermal deformation temperature of base fabrics (A) and (B), thereby expanding said expandable styrene resin particles and forming a foam layer between base fabrics (A) and (B).

* * * * *